United States Patent

Fukuda

[15] 3,683,123

[45] Aug. 8, 1972

[54] METHOD OF DUPLICATING MAGNETIC RECORDING TAPES USING BOTH SURFACES OF MASTER TAPE FOR IDENTICAL SIGNALS

[72] Inventor: Shinro Fukuda, 210 Nakanuma, Minami Ashigara-Machi, Ashigara-Kamigun, Kanagawa, Japan

[22] Filed: June 30, 1970

[21] Appl. No.: 51,234

[30] Foreign Application Priority Data

July 4, 1969 Japan ......................44/52948

[52] U.S. Cl. ................................179/100.2 E, 274/3

[51] Int. Cl. ..........................G11b 5/86, G11b 15/32

[58] Field of Search ................179/100.2 E, 100.2 A; 346/74 MT; 274/3, 11 E; 242/180

[56] References Cited

UNITED STATES PATENTS

| | | | |
|---|---|---|---|
| 2,867,692 | 1/1959 | Camras | 179/100.2 E |
| 2,550,803 | 5/1951 | Goddard | 179/100.2 A |
| 2,923,642 | 2/1960 | Hausen | 179/100.2 A |
| 2,738,383 | 3/1956 | Herr et al. | 179/100.2 E |

FOREIGN PATENTS OR APPLICATIONS

| | | | |
|---|---|---|---|
| 443,772 | 1/1949 | Italy | 179/100.2 E |

*Primary Examiner*—Bernard Konick
*Assistant Examiner*—Alfred H. Eddleman
*Attorney*—Sughrue, Rothwell, Mion, Zinn & Macpeak

[57] ABSTRACT

Duplicate magnetic recordings are simultaneously transposed onto superimposed magnetic tapes sandwiching a master tape whose opposed surfaces each carry a master magnetic recording by subjecting the superimposed tapes to a magnetic field while moving the same.

6 Claims, 11 Drawing Figures

INVENTOR
SHINRO FUKUDA

METHOD OF DUPLICATING MAGNETIC RECORDING TAPES USING BOTH SURFACES OF MASTER TAPE FOR IDENTICAL SIGNALS

BACKGROUND OF THE INVENTION

1. Field of the Invention

The present invention relates to a method of duplicating magnetic recording tapes such as video recording tape, magnetic tapes for computer use, and sound recording tapes and the like.

2. Description of the Prior Art

Generally, in the conventional magnetic tapes, the recorded area constitutes longitudinal or lateral parallel straight bands or tracks. In some magnetic recording tapes, such as video recording tapes, the recorded area sometimes extends longitudinally in the form of skewed parallel straight bands.

The aforesaid conventional magnetic recording tapes of various types in which the recorded area extends in various directions are illustrated in the accompanying drawings which illustrate, in FIG. 1, a magnetic recording tape with a longitudinally extending recorded area. FIG. 2 illustrates a magnetic recording tape comprising spaced laterally extending recording areas or bands, and FIG. 3 illustrates a magnetic recording tape of a special type with a skewed recorded area. In the respective illustrations, the reference numeral 1 indicates the magnetic recording tape while 2 indicates the recorded area thereon.

The recording method for recording the signals on the magnetic recording tape in the form illustrated in FIG. 1 is used where the recording constitute a sound recording signal, a signal employable with electronic computers, and a video recording signal, and is exemplary of recording by employing a stationary magnetic head and the like. The recording method for recording the signal on the magnetic recording tape in the form shown in FIG. 2 is where recording is achieved by a four head type recording a video signal. The recording method resulting in the magnetic tape illustrated in FIG. 3 occurs when recording a video recording signal employing a helical scanning type head.

Since the magnetic recording tape is used for both recording and reproducing the signal wherein the user of the tape employs the same recording and reproducing device, there is no inconvenience by employing various types of recording, as set forth above. Since the field of application of magnetic recording techniques is greatly enlarged in the last few years, the magnetic recording tape, especially sound and signal recording tapes, have come to be used in the form of printed matter for signals and thus constitutes a medium of publication. In other words, what the market desires today is a tape already recorded for the purpose of sound reproduction and not a tape without recording. Thus, magnetic tapes in general sale today constitute printed publications.

In the prior art, in order to make a duplicate of a previously recorded magnetic tape called a "master tape," a second and third recording device of similar type to that recording the original record of the master tape is used in connection with the latter to reproduce the recorded signals. In the case where a plurality of duplicates are desired, a plurality of recording devices are employable simultaneously to record the duplicate records. Such an arrangement of recording devices is shown in FIG. 4, which illustrates a schematic arrangement thereof in which a pair of recording devices A and B on the right are the duplicating devices, while the machine on the left is the master machine. In such a duplicating system, the duplicating recording devices are operated at the same speed as that of the device reproducing the master tape, which of course operates at the same speed as that with which the master tape was prepared.

The method of duplicating the recorded tapes as described above is disadvantageous, since the duplicated tapes become highly expensive due to the number of magnetic recording devices which are necessary for duplicating a large number of tapes from the master. What is even more disadvantageous, is the fact that there is a low limit in the speed of duplication under such a system. In the case of duplicating the recording tape of the type shown in FIG. 1, where the recorded area extends longitudinally in the form of parallel bands, the speed of feeding of the tape during duplication is at the highest, 1.5 meters per second, although the speed is comparatively high in such a case. Accordingly, it takes as long as 8 minutes to duplicate a tape 732 meters in length. In the case of duplicating the recorded tapes of the types shown in FIGS. 2 and 3, the conditions of duplication become worse. In this case, it is an absolute necessity to reproduce the signal recorded at exactly the same speed as that of recording at the time of duplication. Accordingly, it takes as long as 60 minutes to make a duplicate of a tape 732 meters in length and one-half inch in width, which is recorded with a helical scanning head type video tape recorder taking 60 minutes to record the same.

The reason for the slow speed of duplication as described above is mainly due to the signal frequency property based on the magnetic recording principles and a physical characteristic of the magnetic tape at high speed running state.

SUMMARY OF THE INVENTION

Through repeated research into the various methods of duplication, the present invention was conceived which allowed a great number of duplicates of the recording tape to be made in fairly short time by employing a novel method in the duplication of the same. The present invention provides a method of duplicating magnetic recording tapes comprising the steps of superimposing a magnetic recording tape on a master tape and providing an external biasing magnetic field onto the superimposed tape so that the magnetic signal on the master tape is transferred onto the duplicating tape, and the method is characterized by providing on opposite surfaces of the master tape magnetic recording layers carrying the signal to be duplicated.

It is therefore a primary object of the present invention to provide a method of duplicating magnetic recording tapes in which a master tape having magnetic recording layers on opposite surfaces thereof is employed for transferring the magnetic recording signal onto magnetic recording tapes imposed on opposite surfaces of the master tape to form duplicate tapes simultaneously. It is a further object of the present invention to provide a method of duplicating recording tapes in which a pair of magnetic tapes may be made in duplicate of the master tape at the same time without any recording or reproducing device, but only through the use of an electric biasing means for providing a magnetic biasing field on the master tape and the pair of magnetic tapes superimposed thereon on opposite surfaces thereof. The invention provides a method of duplicating magnetic recording tapes in which a number of magnetic tapes can be made into duplicates of the master tape at the same time without any recording or reproducing device necessary.

These and other objects and features of the invention will be apparent to those skilled in the art from the following description taken in conjunction with the accompanying drawings in which:

FIGS. 1 through 4 are illustration of tapes and systems exemplary of the prior art, in which FIG. 1 is an explanatory view of the magnetic recording tape on which magnetic recording signals are recorded along the longitudinal axis of the same.

FIG. 2 is also an explanatory view of a second magnetic recording tape in which the magnetic recording signal is recorded in a direction laterally of the axis of the tape.

FIG. 3 is a view similar to those of FIG. 1 and FIG. 2, for a magnetic recording tape in which the magnetic recording signal is recorded along a direction inclined with the longitudinal axis, and FIG. 4 is a view of the arrangement of recording devices for a duplicating system in accordance with the prior art.

DESCRIPTION OF THE PREFERRED EMBODIMENT

Figure 1:
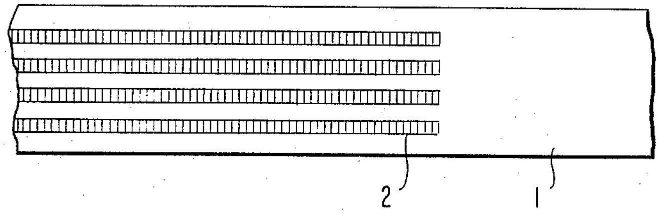
FIG. 1 (PRIOR ART)
Figure 2:
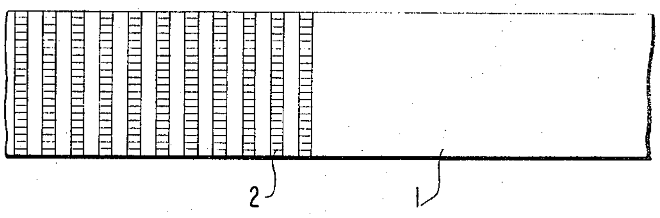
FIG. 2 (PRIOR ART)
Figure 3:
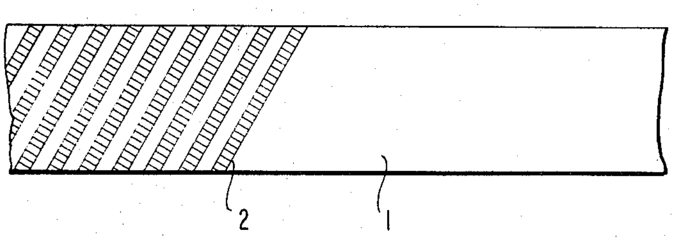
FIG. 3 (PRIOR ART)
Figure 4:
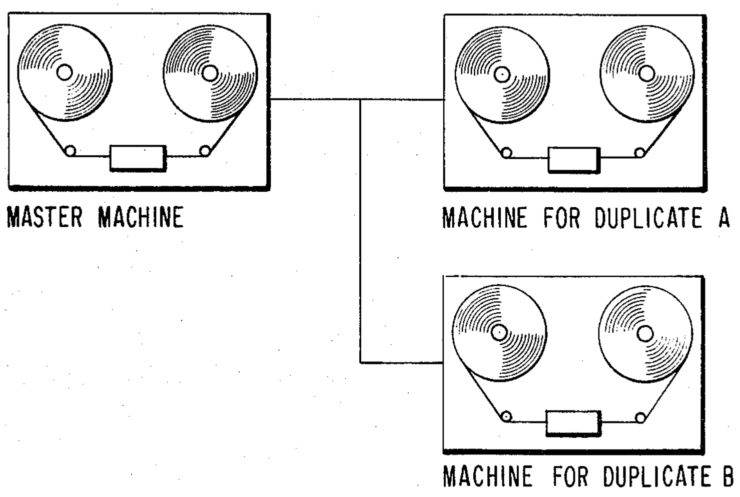
FIG. 4 (PRIOR ART)
Figure 5:
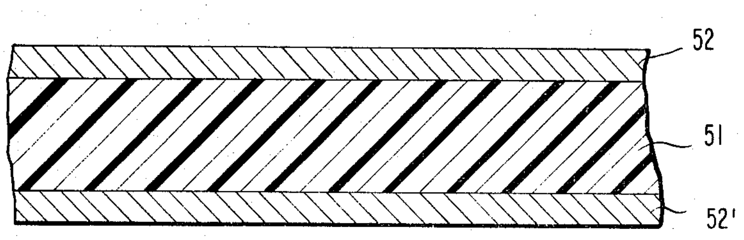
FIG. 5 is a longitudinal cross sectional view of the master tape employable in the method of duplicating magnetic tapes in accordance with the present invention.

Referring to FIG. 5 which illustrates the master tape used in accordance with the method of the present invention in terms of a longitudinal cross section thereof, a polyester base 51 having a thickness of 23$\mu$ is provided with magnetic recording layers 52 and 52' on opposite surfaces thereof. The magnetic recording layers 52 and 52' are made by coating magnetic recording materials of a coersive force of 800 Oe and of a thickness of 3$\mu$ when dried onto the polyester base 51. The coated magnetic material is abraded on the surface thereof, so that the roughness of the surface is controlled to less than 0.15$\mu$ on the average. The master tape is slit and cut into a tape having a length of 732 meters, for instance, and a width of about one-half inch, and then the master signal is recorded on both surfaces thereof by means of a helical scanning type head video tape recorder in inverse relation with the signal on the duplicated tape.

Figure 6A:
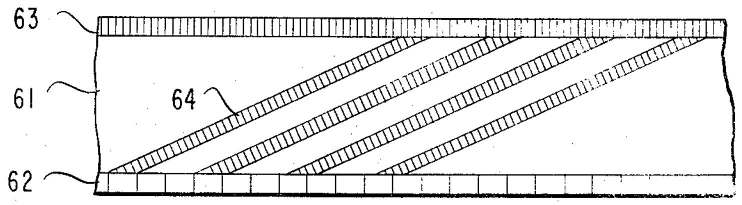
FIG. 6A is a plan view of the recorded pattern of the duplicated magnetic tape made in accordance with the present invention.
Figure 6B:
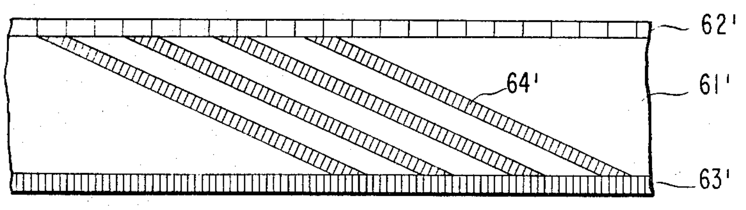
FIG. 6B is a plan view showing the recorded pattern of the master tape on one surface thereof as prepared in accordance with the present invention.

As shown in FIG. 6A, the recorded signal pattern on the duplicated tape 61 is in the inverse relation with that appearing on the master tape 61', as illustrated in FIG. 6B. The reference numerals 62 and 62' indicate the synchronizing signal tracks and the numerals 63 and 63' indicate the sound signal tracks. The skewed video recording signal tracks are identified by the numerals 64 and 64' respectively.

In the above-described example of the duplicating method, the master tape 61' was fed at a speed of 30 cm per second at the time of recording. The relative speed of the video recording head with the running tape was 12 m per second. Thus, the master tape for duplication is so prepared. It should be understood that the master tape can be made under different conditions from that described above, which are only exemplary of one method involved. In the process of duplication, the master tape is brought into surface contact with the magnetic tapes to be recorded on. There are a variety of arrangements of duplicating devices employable with the duplicating method of the present invention. As to the variety of arrangements, the operation, in effect, will be described in detail hereinbelow by further reference to FIGS. 7 through 10 inclusive.

Figure 7:
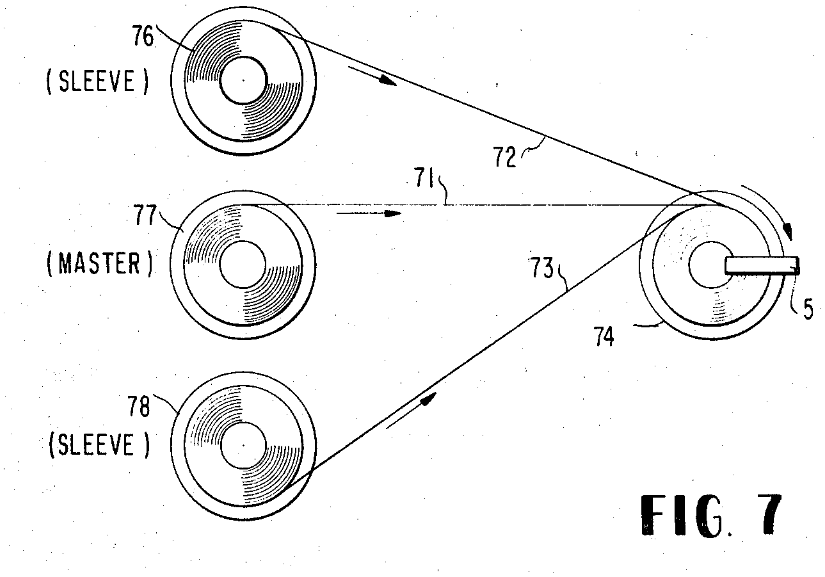
FIG. 7 is a side elevational view showing schematically the arrangement of the devices in accordance with one embodiment of the present invention.

In one basic arrangement illustrated in FIG. 7, the master tape 71, which is wound on reel 77, is removed from the supply reel 77 and taken up by the take up reel 74. On the opposite sides of reel 77 are located a pair of reels 76 and 78, which carry magnetic tapes 72 and 73, which are to carry the duplicate recorded signal as that carried by the master tape. The magnetic tapes 72 and 73 are also removed from the respective reels 76 and 78 and are superimposed on opposite faces of the master tape 71 and all tapes are then taken up on the takeup reel 74, that is, both duplicating magnetic tapes 72 and 73 and the master tape 71. In this case, the face of the magnetic tape 72 and 73 carrying the magnetic recording layer are to be in surface contact with the surfaces of the master tape 71 which opposed surfaces carry the recorded signal to be duplicated so that the magnetic layers on the magnetic tape 72 and 73 are in contact with the magnetic layers appearing on opposite sides of the master tape 71. After the whole length of the magnetic tape 72 and 73 are taken up on the take up reel 74, together with the master tapes 71, the speed of rotation of the take up reel 74 is reduced and a magnetic field for duplication is provided with respect to the convolutions of all tapes on the take up reel 74. The magnetic field is provided suitably by an electromagnet 5, which is located above the take up reel 74 and in close relationship therewith by providing the above-described magnetic field on the superimposed tapes within the convolutions appearing on the take up reel 74, the magnetic recording signal on the master tape 71 is thereby transferred directly to the magnetic tape 72 and 73, sandwiching the same. After the duplication process is completed as a result of energization of electromagnet 5, the magnetic tape 72 and 73 are rewound onto the respective supply reels 76 and 78 with the master tape 71 being rewound on reel 77 at high speed, all tapes being rewound simultaneously. Thus, the duplicates are readily transferred to reels 76 and 78. In the illustrated arrangement, in one example, it took 3 minutes for winding and rewinding of the tapes into take up reel 74 and from take up reel 74 to reels 76, 77 and 78, while it took a single minute for the transducing or transferring operation. Thus, a pair of duplicate tapes were obtained in a total of 4 minutes. It is understood that the above-described operation may be repeated a great number of times by using the same master tape.

Figure 8:
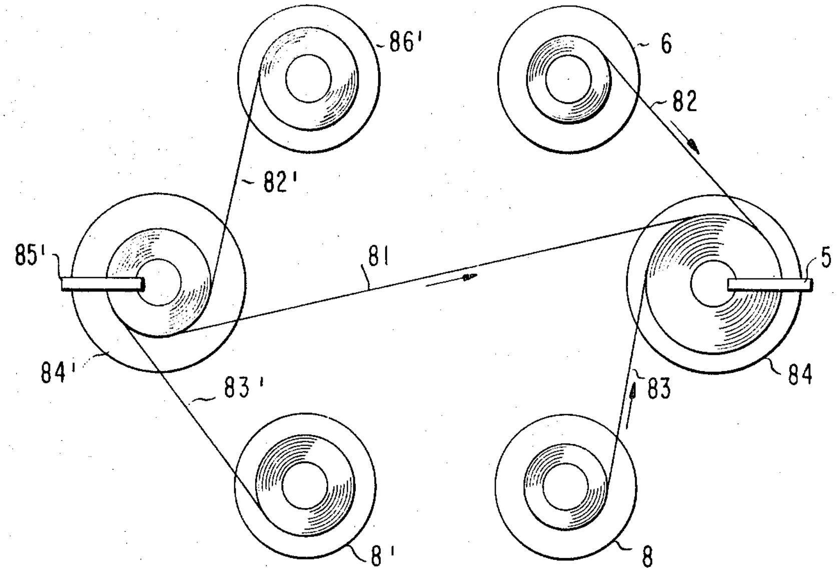
FIG. 8 is a side elevational view showing the arrangement of the devices used in an alternate method of duplicating the magnetic recording tape in accordance with a second embodiment of the present invention.

A second arrangement of the duplicating system of the present invention is illustrated in FIG. 8. In this arrangement, when the master tape 81 is rewound from reel 84' onto reel 84, which effect is to rewind the duplicated magnetic tape 82' and 83', another pair of magnetic tapes 82 and 83 a re wound up onto reel 84 together with the rewound master tape 81. Thus, the time for duplicating the tapes is greatly lessened. In accordance with the embodiment shown in FIG. 8, four duplicate tapes may be obtained within 4 minutes. The duplication rate is doubled by this arrangement with respect to the simplified arrangement of FIG. 7.

In the case where the master tape is provided with a magnetic recording layer on one surface thereof, only one duplicate can be obtained within the same time.

It has been determined by experimentation, that under the method of the present invention the thinner the master tape, the better duplication occurs. In view of this fact, the thickness of the master tape is preferably less than 35$\mu$ and, if possible, less than 30$\mu$.

Figure 9:
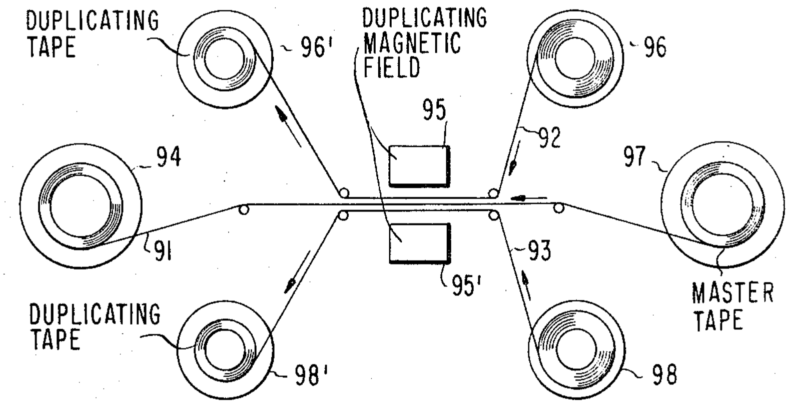
FIG. 9 is a side elevational view, showing the arrangement of the recording devices in accordance with another embodiment of the present invention.

In FIG. 9, another arrangement of the present invention is illustrated in which a master tape 91 is mounted on a supply reel 97 and is withdrawn from the reel 97 and taken up by take up reel 94. Between the two reels 97 and 94 carrying the master tape 91, magnetic tapes 92 and 93 which are to receive the transferred signal, are brought into contact with the master tape 91. Where the three tapes 91, 92 and 93 are in contact with each other, a magnetic field is provided by an electromagnet 95. The electromagnet 95 is so located that the opposite poles may be provided on the opposite sides of the tapes. Since in this case as shown in FIG. 9, the magnetic tapes 92 and 93 are removed from the reels 96 and 98 and taken up onto the separate reels 96' and 98', there is no need for rewinding the duplicated tapes.

Figure 10:
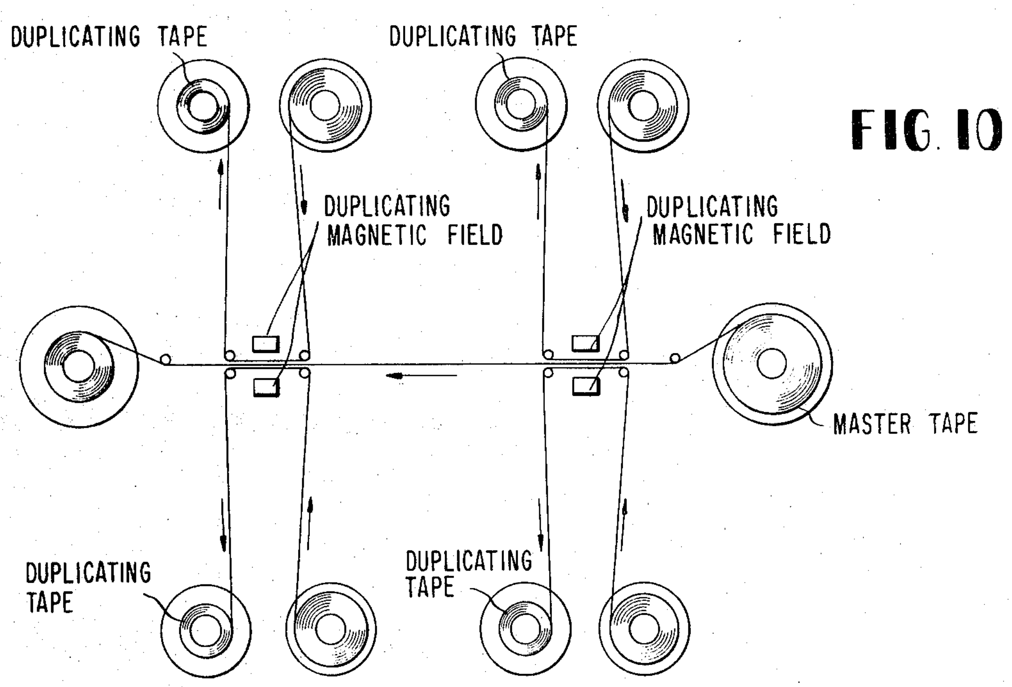
FIG. 10 is a side elevational view, showing a fourth arrangement of the recording devices in accordance with a further embodiment of the present invention.

By arranging the reels and tapes in the form of the arrangement illustrated in FIG. 9 with respect to the electromagnet causing duplicating, it is possible to duplicate a large number of magnetic tapes at a single time. One of the improved arrangements of the devices illustrating this type of arrangement, is shown in FIG. 10. It is readily apparent when viewing said FIG. 10, any number of pairs of magnetic tapes can be duplicated at a single time. This results in a great increase in the number of duplicates made from one operation employing one master tape only.

The principle of the magnetic transfer technique employed in the present invention which is not part of the present invention, is disclosed in the article "Characteristics of Transfer for the Magnetic Signal On the Magnetic Recording Tape" No. 10, Vol. 46 of the Journal of the Society of Electrical Communication.

What is claimed is:

1. The method of duplicating magnetic recording tapes comprising the steps of:
preparing a master tape having magnetic recording layers on both surfaces thereof,
magnetically recording the same master recording signal on both of said recording layers,
sandwiching both surfaces of said master tape with magnetic recording tape in contact therewith and moving said contacting tapes in the presence of a magnetic field to effect simultaneous duplication of said master recording signal on said magnetic recording tapes sandwiching said master tape.

2. The method of duplicating magnetic recording tapes as claimed in claim 1, wherein said step of sandwiching said master tape with magnetic recording tapes on opposed surfaces thereof constitutes taking up said master tape and the individual magnetic tapes sandwiching the same in superimposed fashion onto a common take up reel, and after fully winding up all of said tapes, rotating said reel slowly with said superimposed tape convolutions subjected to a common magnetic field.

3. The method of duplicating magnetic recording tapes as claimed in claim 2, wherein the step of moving said superimposed tapes in a magnetic field comprises energizing an electromagnet which is disposed in close relationship to said take up reel carrying said superimposed tape convolutions.

4. The method of duplicating magnetic recording tapes as claimed in claim 3, further comprising taking up said master tape onto a second take up reel simultaneously with different magnetic recording tapes to receive the duplicated magnetic recording in contact with respective surfaces of said master tape at the time that the master tape is rewound from the first take up reel whereby the duplicating process is repeated during rewinding of the master tape from the previous duplicating process.

5. The method of duplicating magnetic recording tapes as claimed in claim 2, further comprising taking up said master tape onto a second take up reel simultaneously with different magnetic recording tapes to receive the duplicated magnetic recording in contact with respective surfaces of said master tape at the time that the master tape is rewound from the first take up reel whereby the duplicating process is repeated during rewinding of the master tape from the previous duplicating process.

6. The method of duplicating magnetic recording tapes as claimed in claim 1, wherein the step of superimposing magnetic recording tapes in contact with both surfaces of the master tape comprises moving a pair of magnetic tapes to be duplicated into contact with said master tape during feeding of the master tape from one reel to another with said pair of magnetic tapes contacting said master tape being fed at the same speed as said master tape moves between said reel.

* * * * *